(12) United States Patent
Sade et al.

(10) Patent No.: US 8,762,636 B2
(45) Date of Patent: Jun. 24, 2014

(54) DATA STORAGE SYSTEM HAVING A GLOBAL CACHE MEMORY DISTRIBUTED AMONG NON-VOLATILE MEMORIES WITHIN SYSTEM DISK DRIVES

(75) Inventors: Gilad Sade, Newton, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 351 days.

(21) Appl. No.: 11/610,745

(22) Filed: Dec. 14, 2006

(65) Prior Publication Data

US 2008/0147970 A1 Jun. 19, 2008

(51) Int. Cl.
*G06F 13/16* (2006.01)

(52) U.S. Cl.
USPC ............ 711/113; 711/103; 711/130; 711/147

(58) Field of Classification Search
USPC .................................. 711/130, 113, 103, 147
See application file for complete search history.

(56) References Cited

U.S. PATENT DOCUMENTS

| | | | |
|---|---|---|---|
| 5,206,939 A | 4/1993 | Yanai | |
| 2001/0034816 A1* | 10/2001 | Michael et al. ............... | 711/119 |
| 2003/0028819 A1* | 2/2003 | Chiu et al. ............... | 714/5 |
| 2003/0101267 A1* | 5/2003 | Thompson et al. ............ | 709/227 |
| 2004/0088481 A1* | 5/2004 | Garney ............................ | 711/113 |
| 2005/0071556 A1 | 3/2005 | Walton | |
| 2005/0228941 A1* | 10/2005 | Abe et al. ....................... | 711/113 |
| 2008/0082648 A1* | 4/2008 | Ahmed et al. ............... | 709/223 |

FOREIGN PATENT DOCUMENTS

| | | |
|---|---|---|
| EP | 1 199 637 | 4/2002 |
| WO | WO 02/01364 | 4/2002 |
| WO | WO 2005/066788 | 7/2005 |

OTHER PUBLICATIONS

"Cache-Only Memory Architectures" by Dahlgrn et al., Computer, IEEE Service Center. Los Alamitos, CA vol. 32, No. 6, Jun. 1999, pp. 72-79.
International Search Report, Oct. 2005.
Written Opinion, Apr. 2005.

* cited by examiner

*Primary Examiner* — Jae Yu
(74) *Attorney, Agent, or Firm* — Krishnendu Gupta; Jason A. Reyes; John T. Hurley

(57) ABSTRACT

A data storage system having a host computer/server coupled to a bank of disk drives through an interface. The bank of disk drives has a plurality of disk units, each one of such disk drive units having a magnetic storage media. The interface includes: a plurality of front-end directors coupled to the host computer/server; a plurality of back end directors coupled to the disk drive units; and, a global cache memory available for caching user data for the plurality of disk drives. The global cache memory comprises a plurality of non-volatile memory global cache memory sections distributed among disk drive units within the bank of disk drive units. The non-volatile memory global cache memory sections are connected to the back-end directors. Each one of the non-volatile memory global cache memory sections caches user data for the magnetic storage media of the plurality of disk drive units independent of the one of the disk drive units having such one of the non-volatile memory global cache memory sections.

6 Claims, 5 Drawing Sheets

DATA STORAGE SYSTEM HAVING A GLOBAL CACHE MEMORY DISTRIBUTED AMONG NON-VOLATILE MEMORIES WITHIN SYSTEM DISK DRIVES

TECHNICAL FIELD

This invention relates generally to data storage systems, and more particularly to data storage systems having redundancy arrangements to protect against total system failure in the event of a failure in a component or subassembly of the storage system.

BACKGROUND

As is known in the art, large host computer systems require large capacity data storage systems. These large computer systems generally include data processors which perform many operations on data introduced to the computer system through peripherals including the data storage system. The results of these operations are output to peripherals, including the storage system.

One type of data storage system is a magnetic disk storage system. Here a bank of disk drives and the computer system are coupled together through an interface. The interface includes "front end", directors (or controllers) and "back end" disk directors (or controllers). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the front-end directors and disk directors, an addressable global cache memory. The global cache memory is a semiconductor memory connected to all of the front end directors and back end directors and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

In operation, when the host computer wishes to store end-user (i.e., host computer) data at an address, the host computer issues a write request to one of the front-end directors to perform a write command. One of the front-end directors replies to the request and asks the host computer for the data. After the request has passed to the requesting one of the front-end directors, the director determines the size of the end-user data and reserves space in the cache memory to store the request. The front-end director then produces control signals for such front-end director. The host computer then transfers the data to the front-end director. The front-end director then advises the host computer that the transfer is complete. The front-end director looks up in a Table, not shown, stored in the cache memory to determine which one of the rear-end directors is to handle this request. The Table maps the host computer address into an address in the bank of disk drives. The front-end director then puts a notification in a "mail box" (not shown and stored in the cache memory) for the rear-end director which is to handle the request, the amount of the data and the disk address for the data. Other rear-end directors poll the cache memory when they are idle to check their "mail boxes". If the polled "mail box" indicates a transfer is to be made, the rear-end director processes the request, addresses the disk drive in the bank, reads the data from the cache memory and writes it into the addresses of a disk drive in the bank. When end-user data previously stored in the bank of disk drives is to be read from the disk drive and returned to the host computer, the interface system operates in a reciprocal manner. The internal operation of the interface (e.g. "mail-box polling", event flags, data structures, device tables, queues, etc.) is controlled by interface state data (sometimes referred to as metadata) which passes between the directors through the cache memory. Further, end-user data is transferred through the interface as a series of multi-word transfers, or bursts. Each word transfer in a multi-word transfer is here, for example, 64 bits. Here, an end-user data transfer is made up of, for example, 32 bursts. Each interface state data word is a single word having, for example, 64 bits.

As is also known in the art, many systems of the type described above include two separate cache global memories for redundancy. Further, because these global cache memories are DRAM, or other volatile type memory, there is a need for a battery backup for the memories.

As is also known in the art, a new type of disk drive is expected to be available shortly. This new type of disk drive is a hybrid disk drive and includes a large-buffer computer hard drive (i.e., a magnetic storage-media) as well as large buffer (up to 1 GB) of non-volatile flash memory to cache data during normal use.

SUMMARY

In accordance with the present invention, a data storage system is provided having a host computer/server coupled to a bank of disk drives through an interface. The bank of disk drives has a plurality of disk units, each one of such disk drive units having a magnetic storage media. The interface includes: a plurality of front-end directors coupled to the host computer/server; a plurality of back end directors coupled to the disk drive units; and, a global cache memory available for caching user data for the plurality of disk drives. The global cache memory comprises a plurality of non-volatile memory global cache memory sections distributed among disk drive units within the bank of disk drive units. The non-volatile memory global cache memory sections are connected to the back-end directors. Each one of the non-volatile memory global cache memory sections caches user data for the magnetic storage media of the plurality of disk drive units independent of the one of the disk drive units having such one of the non-volatile memory global cache memory sections.

Thus, here the non-volatile memory global cache memory section in a disk drive unit is not merely caching user data for transfer to the magnetic storage media of the same drive unit, but rather the non-volatile memory global cache memory section in a disk drive unit is serving as part of a global cache memory and the user data cached therein may be transferred to the magnetic storage media of a different disk drive unit without ever having been first stored in the magnetic media having the cached user data.

Thus, the system uses the NVM of the hybrid disk drive units (i.e., disk drive units that include NVM (e.g., Flash memory) and magnetic storage media on the disk drive unit instead of using a dedicated volatile global cache memory that requires a battery backup. As noted above, the NVM global cache memory sections in the disk drive units collectively provide a global cache armory for the system and store user data accessible for any one of the back end directors in retrieving user data stored in the global cache memory. Further, the NVM of each disk drive unit can be accessed by a pair of back end directors for redundancy.

In one embodiment, the interface includes a data transfer section coupled to the plurality of front and back end directors, the front-end directors and the back end directors controlling, in response to interface state data, transfer of user data between the host computer/server and bank of disk drives as such user data passes through the data transfer section.

In accordance with another feature of the invention, a method is provided for a writing user data from a host computer/server to a bank of disk drives in a data storage system. The host computer/server is coupled to the bank of disk drives through an interface. The interface includes: a plurality of front-end directors coupled to the host computer/server; a plurality of back end directors coupled to the bank of disk drives; and a data transfer section coupled to the a plurality of front-end directors and to the a plurality of back end directors. The bank of disk drives includes a plurality of disk drive units, each one of the disk drive units having a magnetic storage media, each one of the disk drove units being connected to at least one of the back end directors. The method comprising: distributing a global cache memory comprising a plurality of non-volatile memory global cache memory sections among disk drive units; transferring the user data from host computer/server through one of the front end directors to one of the back end directors through the data transfer section; caching the user data in one of the plurality the of non-volatile memory global cache memory sections connected to such one of the back end directors; transferring the cached user data from such one of the plurality the of non-volatile memory global cache memory sections through the back end director connected thereto to a different one of the back end directors through the data transfer section; and storing the cached user data in the magnetic storage media of the one of the disk drive unites connected to the different one of the back end directors.

In one embodiment, the user data transfer from said one of the plurality the of non-volatile memory global cache memory sections through the back end director connected thereto to a different one of the back end directors by-passes the magnetic storage media the disk drive unit having such one of the one of the plurality the of non-volatile memory global cache memory sections.

During a write operation, a write user data requesting one of the front-end directors sends user data to the data transfer section. There, such data transfer section uses the interface data stored in the data transfer section to determine one, or more, of the drive units with the NVM therein having an available storage for the user data to thereby cache such user data therein and once there is available storage, the one of the back-end directors connected to such determined one of the disk drive units is notified of an intended write user data transfer and the determined one of the back-end director initiates the write user data transfer into NVM of the notified disk drive units. (It is to be noted that the notified one of the disk drive units is not necessarily the one where this data belongs as determined by the interface state data (i.e., which is defined by the configuration of the system)). Once the user data write operation is complete and the user data has been successfully written into the NVM connected to the notified one of the back end directors, such notified one of the back end directors notifies the front-end director that requested the write operation of the completion of the user data write operation.

It is noted that the user data may have been written into the NVM of a disk drive unit that does not have the magnetic storage media where the user data is to be written. In order to stored the cache user data in the proper magnetic storage media location (i.e., store the cached user at in the disk drive having the magnetic storage media that is to store the user data (i.e., the magnetic storage media having the location specified by the host computer and then mapped by the interface state data (i.e., the system configuration))), the one of the back-end directors connected to the disk drive having the cached user data transfers the cached user data from NVM of the disk drive unit having written there the cache user data through the data transfer section to the back end director connected to the proper disk drive unit having the magnetic storage media which is to stored the cached user data. Thus, in order to bring the cached user data to the data transfer section, the back end director connected to the proper disk drive unit having the proper magnetic storage media then transfers the user data in a memory of the data transfer section to the proper disk drive unit.

During a read operation, if one of the front end directors requests user data from the bank of disk drives, such requesting one of front end directors makes a request for the user data and such request is checked by the requesting one of the front end director determining, from interface system data stored in the data transfer section, whether the requested user read data is stored in one of the non-volatile memory units collectively providing the global cache memory. If the requested user data is stored in one of the non-volatile memory units, the requesting one of the front-end directors determines from the interface state data stored in the data transfer section the one of the non-volatile memory units having stored therein the read requested user data and also determines the one of the back-end directors connected to the one of the disk drive units having the requested user data stored in the non-volatile memory thereof. The determined one of the back end directors then transfers the requested user data to the requesting one of the front-end directors.

On the other hand, if it is determined that the requested user data is not in one of the NVM global memory section collectively providing the global cache memory (i.e., which means that the data is on the magnetic storage media of the drive unit which had been allocated storage for the requested user data) the data transfer section determines the one of the back end directors connected to the front end directors having the read requested data stored in the magnetic storage media thereof. The determined one of the back-end directors connected to the one of the disk drive units having the read requested data stored in the magnetic storage media thereof reads the requested data and stores such read user data into the volatile memory of the data transfer section. Then the front-end director retrieves the read user data from the data transfer section and sends such read data to the host computer/server.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
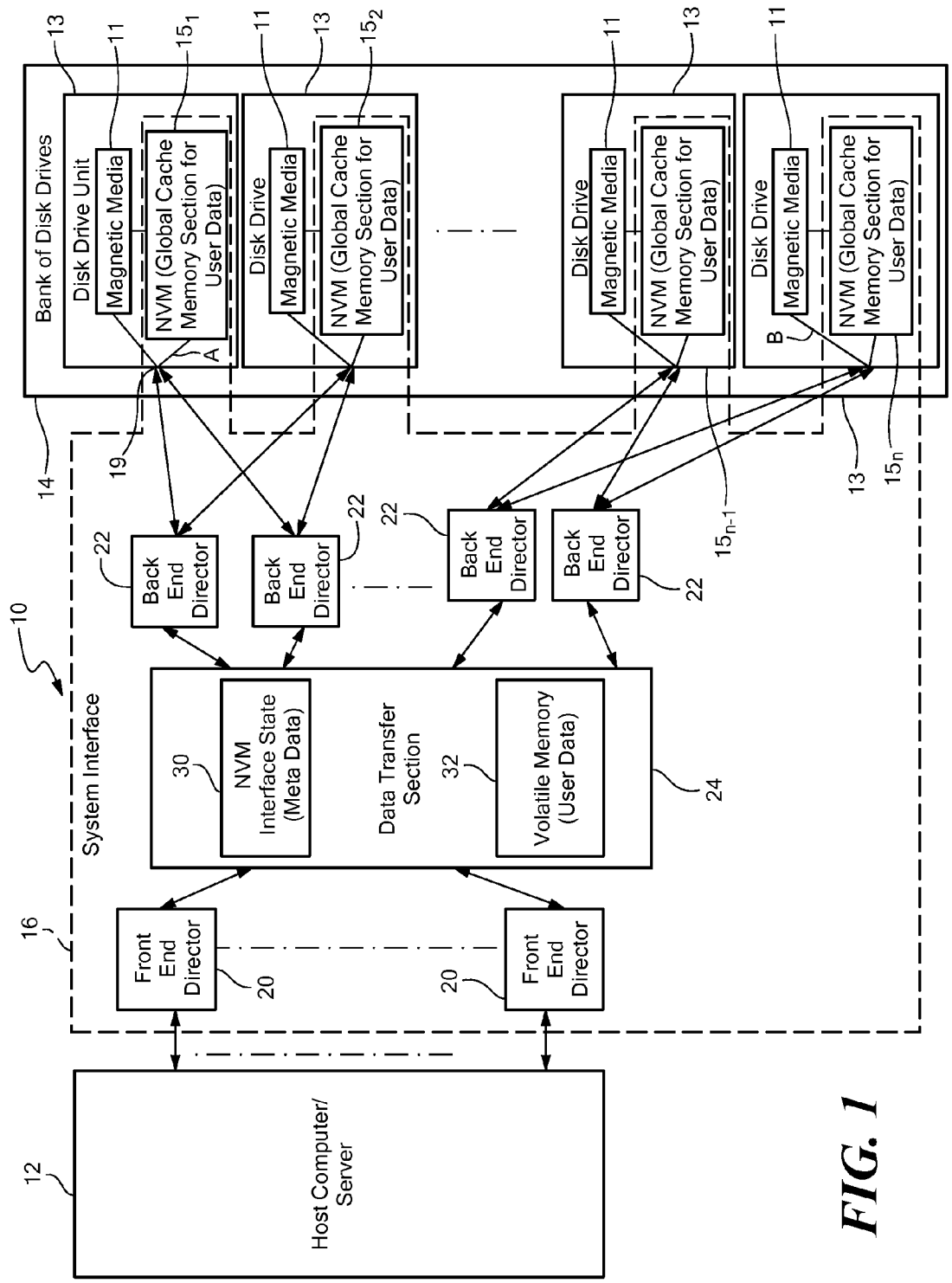
FIG. 1 is a block diagram of a data storage system according to the invention.

Referring now to FIG. 1, a data storage system 10 is provided having a host computer/server 12 coupled to a bank of disk drives 14 through a system interface 16. The interface 16 comprises: a plurality of front-end directors 20 coupled to the host computer/server 12; a plurality of back end directors 22 coupled to the bank of disk drives 14; and, a global cache memory comprising a plurality of non-volatile memory (NVM) global cache memory sections $15_1$-$15_n$ distributed among disk drive units 13 within the bank of disk drives 14. Thus, the global memory comprises the plurality of non-volatile memory (NVM) global cache memory sections $15_1$-$15_n$. Each one of the disk drive units 13 is assigned a block of addresses. The block of addresses assigned to one of the disk drive units 13 is different from the block of address assigned to the other ones of the disk drive units 13. Each one of the NVM global cache memory sections $15_1$-$15_n$ is connected to a pair of the back-end directors 22. The interface 16 also includes a data transfer section 24 coupled to the plurality of front and back end directors 20, 22. The front-end directors 20 and the back end directors 22 control, in response to interface state data (sometimes also referred to herein as metadata), the transfer user data between the host computer/server and bank of disk drives as such user data passes through the data transfer section.

Each one of the disk drive units 13 includes a magnetic storage media 11 for storage of the user data in addition to one of the NVM global cache memory sections $15_1$-$15_n$. Thus, the global cache memory is distributed among the plurality of non-volatile global cache memory (NVM) sections $15_1$-$15_n$, each one of the non-volatile global cache memory (NVM) sections $15_1$-$15_n$ being disposed in a corresponding one of the disk drive units 13. Each one of the non-volatile memory global cache memory sections $15_1$-$15_n$ is assigned addresses by the interface state data independent of the block of addresses assigned to the one of the disk drive units 13 having such one of the non-volatile memory global cache memory sections $15_1$-$15_n$ therein. Thus, user data may be cached in one of the non-volatile memory global cache memory sections $15_1$-$15_n$ disposed in one of the disk drive units 13 before being transferred through the data transfer section 24 for storage of such user data in the magnetic storage media 11 of another one of the disk drive units 13.

Thus, here the non-volatile memory global cache memory section $15_1$-$15_n$ in a disk drive unit 13 is not merely caching user data for transfer to the magnetic storage media 11 of the same drive unit 13, but rather the non-volatile memory global cache memory section $15_1$-$15_n$ in a disk drive unit 13 is serving as part of a global cache memory and the user data cached therein may be transferred to the magnetic storage media 11 of a different disk drive unit 13 without ever having been first stored in the magnetic media 11 having the cached user data.

Thus, the system 10 uses the NVM of the hybrid disk drives (i.e., disk drive units that include NVM (e.g., Flash memory) and magnetic storage media 11 on the disk drive unit 13 instead of using a dedicated volatile global cache memory that requires a battery backup. As noted above, the NVM global cache memory sections in the disk drive units collectively provide a global cache memory 15 for the system 10 and store user data accessible for any one of the back end directors 22 in retrieving user data stored in the global cache memory 15.

It is noted that each disk drive unit 13 has an input/output port 19. The input/output port 19 of each disk drive unit 13 is connected to a pair the back end directors 22. Further, the input/output port 19 of each one of the disk drive units 13 is connected to the magnetic storage media 11 in such one of the disk drive units 14. Also, the input/output port 19 of each one of the disk drive units 13 is connected to the NVM global cache memory section $15_1$-$15_n$ in such one of the disk drive units 13. Also, the magnetic storage media 11 in each one of the disk drive units 13 is connected to the NVM global memory section $15_1$-$15_n$ in such one of the disk drive units 13. It is also noted that each disk drive unit 13 can be accessed by a pair of back end directors 22 for redundancy storage, i.e., storage of a copy of user data being written into the bank of disk drives 14.

Figure 4:
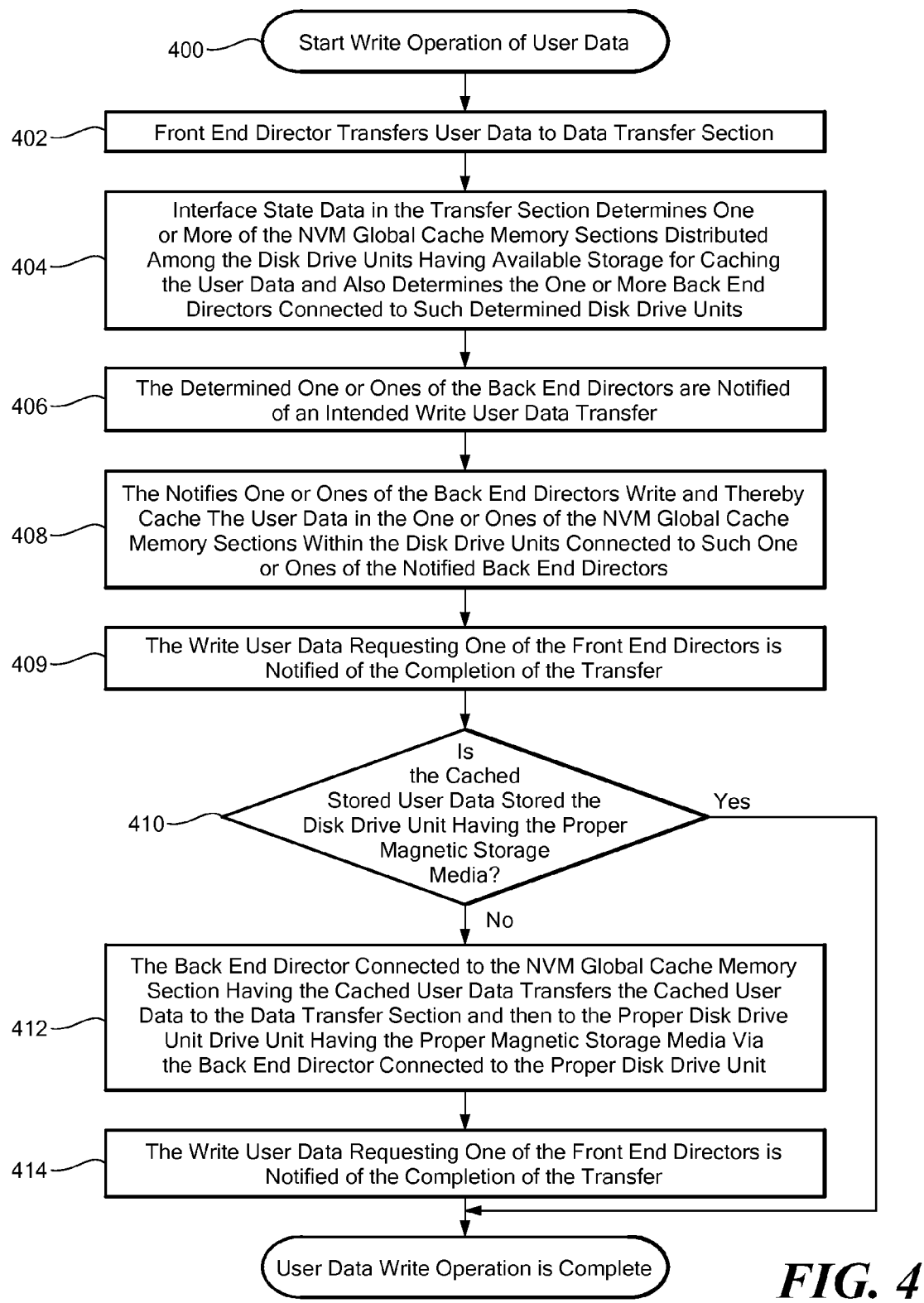
FIG. 4 is a flow diagram of the user data write operation performed by the system of FIG. 1.

Referring now also to FIG. 4, during a write operation, Step 400, the write user data requesting one of the front-end directors 20 sends user data to the data transfer section 14, Step 402. There, the data transfer section 14 uses the interface data stored in a NVM 30 within the data transfer section 14 to determine the drive units 13 with the NVM $15_1$-$15_n$ therein having an available storage for the user data to thereby cache such user data therein, Step 404.

Once there is available storage, the back-end directors 22 connected to such determined one of the disk drive units 13 is notified of an intended write user data transfer and the determined back-end director 22 initiates the write user data transfer into NVM of the notified disk drive units 13, Step 406. (It is to be noted that the notified disk drive unit 13 is not necessarily the one where this data belongs as determined by the interface state data (i.e., which is defined by the configuration of the system)).

Once the user data write operation is complete, Step 408, and the user data has been successfully written into the NVM global memory section $15_1$-$15_n$ in such one of the disk drive units 13 connected to the notified one of the back end directors 22, the write user data transfer initiating back-end director 22 notifies the front-end director 20 that requested the write operation that the user data write operation has been completed, Step 409.

It is noted that the user data may have been written into the NVM global memory section $15_1$-$15_n$ a disk drive unit 13 that does not have the magnetic storage media 11 where the user data is to be written as defined by the interface data. In order to stored the cache user data in the proper magnetic storage media 11 location (i.e., store the cached user at in the disk drive unit 13 having the magnetic storage media 11 that is to store the user data (i.e., the magnetic storage media 11 having the location specified by the host computer 12 and then mapped by the interface state data (i.e., the system configuration))), the one of the back-end directors 22 connected to the disk drive unit 13 having the cached user data transfers the cached user data from NVM global memory section $15_1$-$15_n$ a disk drive unit 13 of the disk drive unit 13 having written there the cache user data through the data transfer section 16 to the back end director 22 connected to the proper disk drive unit 13 having the magnetic storage media 11 which is to stored the cached user data. Thus, in order to bring the cached user data to the data transfer section 24, the back-end director 22 connected to the disk drive unit 13 in which NVM global memory section $15_1$-$15_n$ data is cached requests that such cached data be read and transferred to a volatile memory 32 in the data transfer section 24, Steps 410. The back end director 22 connected to the proper disk drive unit 13 having the proper magnetic storage media 11 then transfers the user data in the volatile memory 32 of the data transfer section 24 to the proper disk drive unit 15, Step 412. The front end director is notified of the write completion once the data is in the NVM 13. A background program after that may move that user data to the correct magnetic storage media. Thus, user data may be cached in one of the non-volatile memory global cache memory sections $15_1$-$15_n$ disposed in one of the disk drive units 13 before being transferred by the background operation through the data transfer section 24 for storage of such user data in the magnetic storage media 11 of another one of the disk drive units 13.

Thus, for example, it is noted that during a write operation and referring to FIG. 1, the user data intended for storage on the magnetic media 11 of the bottom one of the disk dive units 13 may first be cached by the back end director 22 connected to upper one of the disk drive unit 13 into the NVM global cache memory section $15_1$ via the path labeled A. In response to a background program, the cached user data in the NVM global cache memory section $15_1$ is transferred, via the volatile memory 32 in the data transfer section 24 while bypassing, via path A, any storage in the magnetic media 11 of the upper one of the disk drive units 11, to the bottom one of the back end directors 22 and then directly to the magnetic storage media 11 in the bottom one of the disk drive units via path B. Thus, here the NVM global cache memory section $15_1$ is not acting as a cache memory for the magnetic storage media 11 of the upper disk drive unit 13; but rather, the NVM global cache memory section $15_1$ is serving as part of a global cache memory, i.e., cache memory which is used to cache data for all of the system and not for a specific drive or director in the system. That is, in this example, the user data cached in the NVM global cache memory section $15_1$ is available to any element within the system including storage in the magnetic storage media 11 of any one of the disk drive units 22 and is not limited to caching user data for the magnetic storage media within the same disk drive unit as the the NVM global cache memory section $15_1$.

Figure 5:
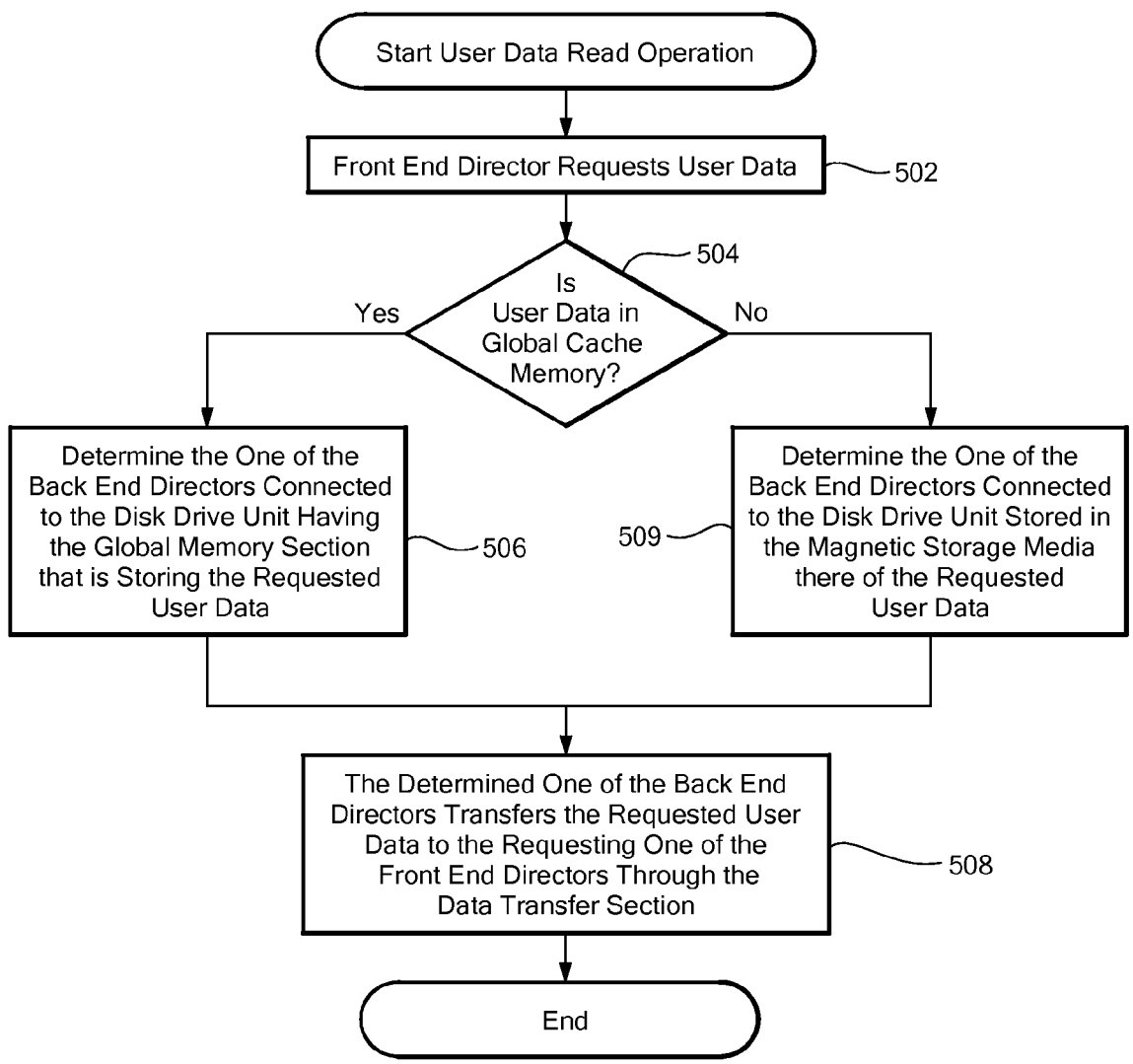
FIG. 5 is a flow diagram of the user data read operation performed by the system of FIG. 1.

Referring now also to FIG. 5, during a read operation, if one of the front end directors 20 requests user data from the bank of disk drives 14, such requesting one of front end directors 20 makes a request for the user data, Step 502. The request is checked by the requesting one of the front end director 20 determining, from interface system data stored in the NVM 30 of the data transfer section 23, whether the requested user read data is stored in one of the NVM global memory section $15_1$-$15_n$ collectively providing the global cache memory 16, Step 504.

If the requested user data is stored in one of the NVM global memory section $15_1$-$15_n$, the requesting one of the front-end directors 20 determines from the interface state data stored in the data transfer section 24 the one of the NVM global memory section $15_1$-$15_n$ having stored therein the read requested user data, Step 506, and also determines the one of the back-end directors 22 connected to the one of the disk drive units 13 having the requested user data stored in the NVM global memory section $15_1$-$15_n$. The determined one of the back end directors 22 then transfers the requested user data to the requesting one of the front-end directors 20, Step 508.

On the other hand, if it is determined in Step 504 that the requested user data is not in one of the NVM global memory section $15_1$-$15_n$ collectively providing the global cache memory 15, (i.e., which means that the data is on the magnetic storage media 11 of the drive unit 13 which had been allocated storage for the requested user data) the data transfer section 24 determines the one of the back end directors connected to the front end directors 20 having the read requested data stored in the magnetic storage media 11 thereof, Step 508. The determined one of the back-end directors 22 connected to the one of the disk drive units 13 having the read requested data stored in the magnetic storage media 11 thereof reads the requested data and stores such read user data into the volatile memory 32 of the data transfer section 24. Then the front-end director 20 retrieves the read user data from the data transfer section 24 and sends such read data to the host computer/server 12, Step 508.

Figure 2:
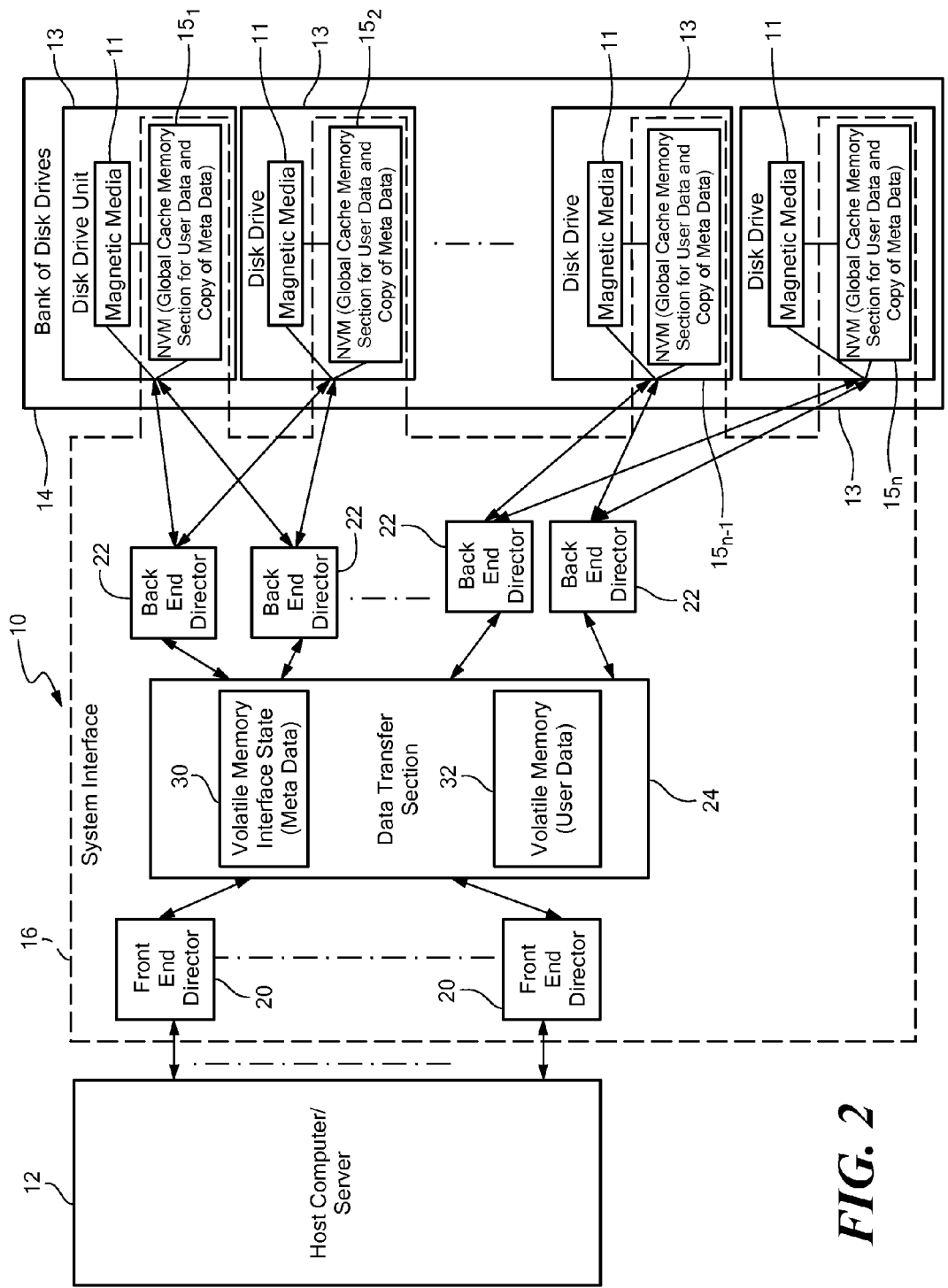
FIG. 2 is a data storage system according to another embodiment of the invention.

Referring now to FIG. 2, here the data storage system has a volatile memory 30' in the data transfer section 24 for the interface state data (i.e., the meta data) and a copy of the interface state data us stored in the NVM global memory section $15_1$-$15_n$.

Figure 3:
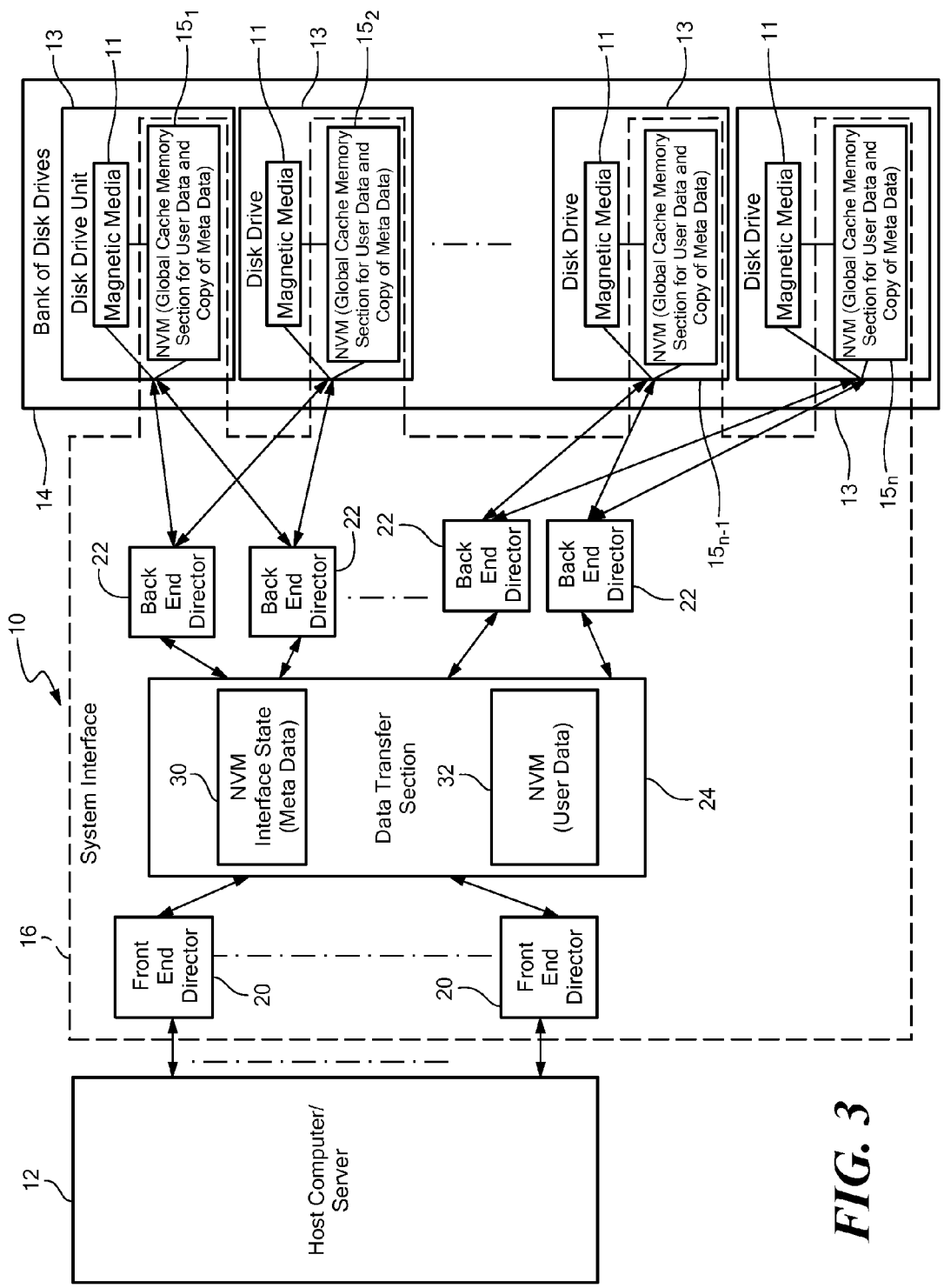
FIG. 3 is a data storage system according to still another embodiment of the invention.

Referring now to FIG. 3, here the data storage system has a non-volatile memory 30 in the data transfer section 24 for first copy of the cached user data and metadata and the second copy on that information is kept for redundancy in the NVM global memory section $15_1$-$15_n$.

A number of embodiments of the invention have been described. Nevertheless, it will be understood that various modifications may be made without departing from the spirit and scope of the invention. Accordingly, other embodiments are within the scope of the following claims.

What is claimed is:

1. A method for a writing user data from a host computer/server to a bank of disk drives in a data storage system, such host computer/server being coupled to the bank of disk drives through an interface, such interface comprising: a plurality of processors coupled to the host computer/server and to the bank of disk drives, the method comprising:

arranging the bank of disk drives into a plurality of disk drive units connected to at least one of the processors, each one of the disk drive units having: (i) a magnetic storage media; and (ii) a non-volatile storage media;

arranging the non-volatile storage media of the plurality of disk drive units into a global cache memory, the non-volatile storage media being distributed among the disk drive units within the bank of disk drives;

transferring the user data from host computer/server to one of the processors;

caching the user data in one of the plurality the of non-volatile storage media connected to such one of the processors;

transferring the cached user data from such one of the plurality the of non-volatile storage media through the one of the processors connected thereto and subsequently to a different one of the processors;

storing the cached user data in the magnetic storage media of the one of the disk drive units connected to the different one of the processors.

2. The method recited in claim 1 wherein the user data transfer from said one of the plurality the of non-volatile storage media through the one of the processors connected thereto to a different one of the processors by-passes the magnetic storage media the disk drive unit having such one of the one of the plurality the of non-volatile storage media.

3. A method for a write data to a bank of disk drives in a data storage system having a host computer/server coupled to a bank of disk drives through an interface, such interface comprising: a plurality of processors coupled to the host computer/server and to the bank of disk drives, comprising:

arranging the bank of disk drives into a plurality of disk drive units, each one of the disk drive units having: (i) a magnetic storage media; and (ii) a non-volatile storage media;

arranging the non-volatile storage media of the plurality of disk drive units into a global cache memory, the non-volatile storage media being distributed among disk drive units within the bank of disk drives;

transmitting from one of the processors user data to a data transfer section;

wherein such data transfer section uses interface data stored in the data transfer section to determine one, or more, of the drive units with the non-volatile storage media therein having available storage for the user data to thereby cache such user data therein;

once available storage has been determined, the one of the processors connected to such determined one of the disk drive units is notified of an intended write user data transfer and the notified one of the processors initiates write user data transfer into non-volatile memory storage media of the determined one of the disk drive units;

once the user data write operation is complete and the user data has been successfully written into the non-volatile storage media connected to the notified one of the processors, such notified one of the processors notifies the sending one of the processors that requested the write operation of the completion of the user data write operation.

4. A method for a reading data from a bank of disk drives in a data storage system having a host computer/server coupled to the host computer/server through an interface, such interface comprising: a plurality of processors coupled to the host computer/server and to the bank of disk drives, comprising:

arranging the bank of disk drives into a plurality of disk drive units, each one of the disk drive units having: (i) a magnetic storage media; and (ii) a non-volatile storage media;

arranging the non-volatile storage media of the plurality of disk drive units into a global cache memory with the plurality of storage media being distributed among disk drive units within the bank of disk drives, comprising:

having one of the processors make a request for the user data;

checking the request by the requesting one of the or processors to determine, from interface system data stored in a data transfer section, whether the requested user read data is stored in one of the non-volatile storage media sections if the requested user data is stored in one of the non-volatile storage media, the requesting one of the processors determines from the interface state data stored in the data transfer section the one of the non-volatile storage media having stored therein the read requested user data and also determines the one of the processors connected to the one of the disk drive units having the requested user data stored in the non-volatile storage media thereof and the determined one of the processors then transfers the requested user data to the requesting one of the processors;

on the other hand, if it is determined that the requested user data is not in one of the non-volatile storage media collectively providing the global cache memory thereby indicating that the data is on the magnetic storage media of one of the drive units, the data transfer section determines the one of the processors connected to one of the processors having the read requested data stored in the magnetic storage media thereof and the determined one of the processors connected to the one of the disk drive units having the read requested data stored in the magnetic storage media thereof reads the requested data and stores such read user data into the non-volatile storage media of the data transfer section;

the requesting one of the processors retrieves the read user data from the data transfer section and sends such read data to the host computer/server.

5. A method for storing data, comprising:

(A) providing a data storage system having a host computer/server coupled to a bank of disk drives through an interface, the bank of disk drives having a plurality of disk units, such interface comprising:
 (a) a plurality processors coupled to the host computer/server and to the disk drive units;
 (b) wherein each one of the disk drive units being a hybrid disk drive having:
  (i) a magnetic storage media; and
  (ii) a non-volatile storage media;
 (c) wherein the non-volatile storage media of the plurality of disk drive units provide a global cache memory available for caching user data for the plurality of disk drive units; and (B) caching user data in the non-volatile storage media caches for the magnetic storage media independent of the one of the disk drive units having such one of the non-volatile storage media, wherein user data cached in one of the non-volatile storage media in one of the disk drive is transferred to the magnetic storage media of a different one of the disk drive units without having been first stored in the magnetic media of the disk drive units having the cached user data.

6. A method for storing data, comprising:

(A) providing a data storage system having a host computer/server coupled to a bank of disk drives through an interface, the bank of disk drives having a plurality of disk units, such interface comprising:
 (a) a plurality processors coupled to the host computer/server and to the disk drive units;
 (b) wherein each one of the disk drive units being a hybrid disk drive having:
  (i) a magnetic storage media; and
  (ii) a non-magnetic storage media;
 (c) wherein the non-magnetic storage media of the plurality of disk drive units provide a global cache memory available for caching user data for the plurality of disk drive units; and (B) caching user data in the non-magnetic storage media caches for the magnetic storage media independent of the one of the disk drive units having such one of the non-magnetic storage media, wherein user data cached in one of the non-magnetic storage media in one of the disk drive is transferred to the magnetic storage media of a different one of the disk drive units without having been first stored in the magnetic media of the disk drive units having the cached user data.

\* \* \* \* \*